United States Patent [19]
Hobbs

[11] 4,056,986
[45] Nov. 8, 1977

[54] TORQUE CONVERTERS

[75] Inventor: Howard Frederick Hobbs, Rugby, England

[73] Assignee: Variable Kinetic Drives, Ltd., Warwickshire, England

[21] Appl. No.: 567,771

[22] Filed: Apr. 14, 1975

[30] Foreign Application Priority Data

Apr. 22, 1974 United Kingdom ............... 17438/74

[51] Int. Cl.² ............................................ F16H 47/08
[52] U.S. Cl. ........................................ 74/688; 74/720; 74/665 F; 74/665 GB; 60/362; 74/701
[58] Field of Search .................. 74/701, 720.5, 665 F, 74/665 GB, 688, 677, 720; 60/361, 362, 342

[56] References Cited

U.S. PATENT DOCUMENTS

| | | | |
|---|---|---|---|
| 2,685,169 | 8/1954 | Saives | 60/362 |
| 3,073,182 | 1/1963 | Harmon | 74/688 |
| 3,411,382 | 11/1968 | Mori | 74/701 |
| 3,435,707 | 4/1969 | De Julian | 74/688 |

*Primary Examiner*—Samuel Scott
*Assistant Examiner*—Wesley S. Ratliff, Jr.
*Attorney, Agent, or Firm*—Dowell & Dowell

[57] ABSTRACT

The invention provides a power transmission apparatus especially for automobiles. It consists of a fluid torque converter coupled with gearing. The gearing includes a first gearing connecting the circulatory turbine to the input shaft and a second gearing connecting the first gearing to the output shaft and to a stationary part. Two unidirectional detents are provided, the first of which acts between the second gearing and a stationary part and the second of which acts between the torque converter reactor and the second gearing. The two detents are in series. Forwards rotation of part of the second gearing drives the reactor in a forwards direction and negative torque on the reactor or said part of the second gearing can act on said stationary part.

10 Claims, 7 Drawing Figures

TORQUE CONVERTERS

This invention relates to power transmission apparatus comprising a hydro-kinetic torque converter combined with change speed gearing and is especially applicable to the apparatus as described in the specifications of British Pat. Nos. 1199521 and 1347045.

The apparatus claimed in British specification No. 1347045 comprises an input shaft, an impeller connected to the input shaft, an output shaft, an output turbine connected to the output shaft, a circulatory turbine disposed in the flow path between the impeller and output turbine, a first gearing and a second gearing, said first gearing connecting the circulatory turbine to the impeller; said second gearing being connected with the first gearing, the output shaft and a stationary part; whereby the first gearing can transmit driving torque from said circulatory turbine to said impeller, and driving torque increased by the second gearing is transmitted from the circulatory turbine through said first gearing to the output shaft, and reaction torque is imparted to said stationary part, so that the said circulatory turbine will always rotate when the impeller rotates and in the same direction but at a speed less than that of the impeller at a lower speed part of the range of speeds of the output shaft and at a speed greater than that of the impeller at a higher speed part of said range.

It is often required to provide means for reversing the direction of rotation of the output shaft and also to provide means for increasing the braking effect when the converter output is rotating in a forwards direction, but when the drive to the converter is reversed and applied to the shaft which normally acts as the output shaft.

For example when a converter is used in a motor vehicle it is necessary to be able to 'reverse' the vehicle and desirable to provide braking when descending a steep hill.

Means to achieve these operations can be bulky and complicated and may cost as much to manufacture as the torque converter.

An object of the present invention is to simplify the construction and improve the operation of a hydro-kinetic torque converter apparatus having reversing and braking means.

Another object is to combine reversing and braking means with the transmission apparatus described in the above mentioned specifications in such a manner as to utilise the same gearing of said apparatus as part of said reversing and braking means.

According to the invention a power transmission apparatus comprises a torque converter having an input shaft, an impeller connected to the input shaft, an output turbine, a reactor and a circulatory turbine, a first gearing connecting the circulatory turbine to the input shaft, a second gearing connecting the first gearing to the output shaft and to a stationary part, a first unidirectional detent acting between a part of the second gearing and said stationary part, and a second unidirectional detent acting between the reactor and the second gearing, said detents being in series so that forwards rotation of a part of the second gearing drives the reactor in a forwards direction and negative torque on either the reactor or said part of the second gearing can act on said stationary part.

The first detent acting from said part of the secondary gearing may be provided with a friction brake so that it may be connected to or disconnected from the stationary part.

The second gearing may include a part which carries a second friction brake so that this element can be connected to a stationary part.

The second gearing may be generally as shown in the specification of British Pat. No. 1347045 but this is located outside of the converter. A ring gear may be added which carries the second brake and meshes with one set of pinions, which in turn mesh with the sun-gear carried by that part of the secondary gearing which is acted on by the one way detents.

The invention will be further described by way of example with reference to the accompanying drawings wherein.

Figure 1:
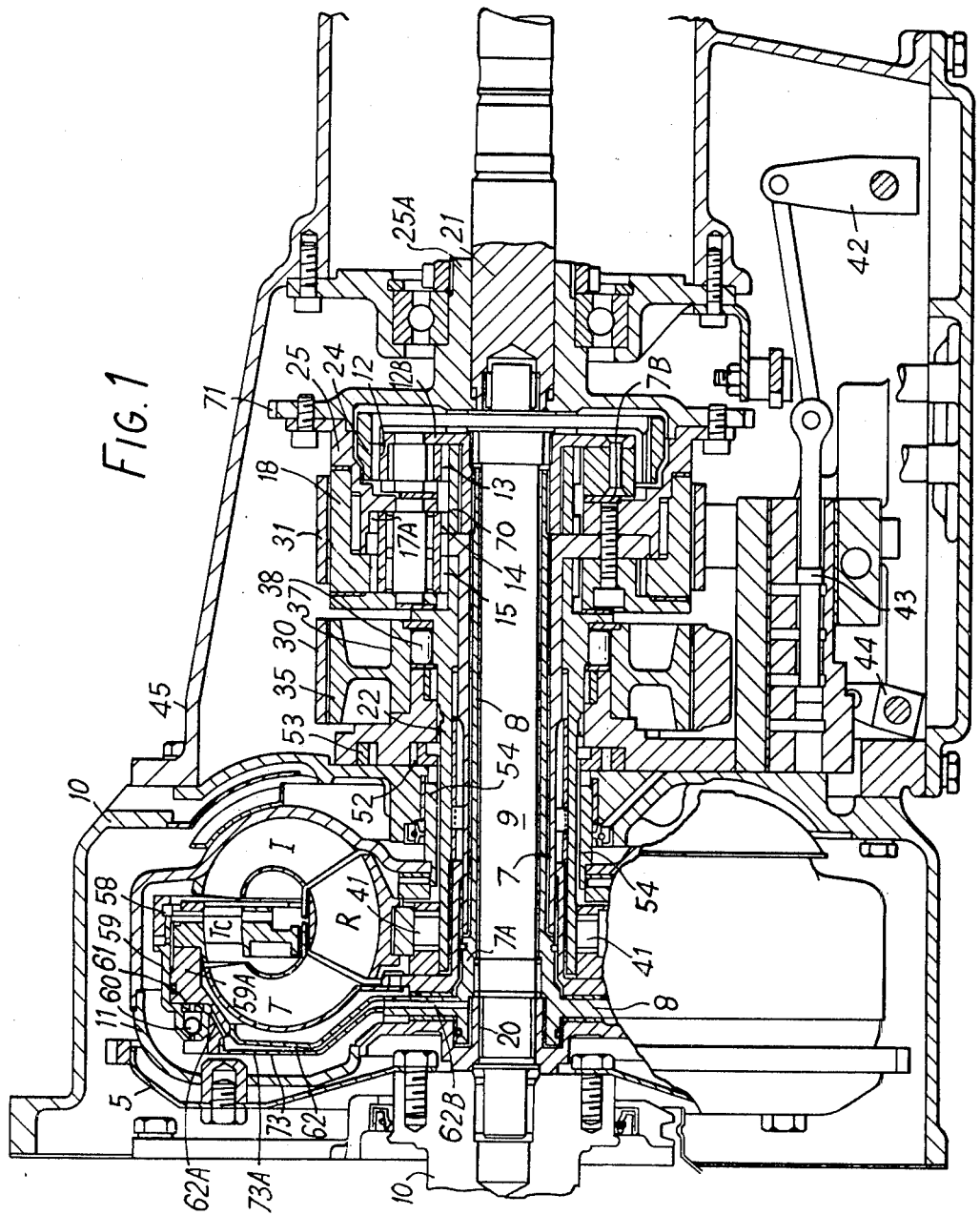
FIG. 1 is a part sectional view of an apparatus suitable for a motor car and made in accordance with the invention.

In FIG. 1 there is shown an input shaft 10 and an output shaft 21. An impeller 1 is connected to the input shaft 10 by a rotary housing 11 and drive plate 5. The housing 11 is splined at 20 to a central shaft 9. A circulatory turbine TC is mounted on a pair of discs 73, 73A, which are fixed on a sleeve 8 that surrounds the central shaft 9.

An output turbine T is mounted on a hub 7A which is splined on sleeve 7 which surrounds the sleeve 8. A reactor R engages a sleeve 22 by means of a unidirectional detent device 41.

The sleeve 22 carries a unidirectional detent device 38, 37. The outer member 37 connects a brake drum 35 which is surrounded by a brake band 30.

The central shaft 9 carries an internally toothed ring gear 24 engaged by a set of planetary pinions 12 which also mesh with a sunwheel 13.

Figure 2:
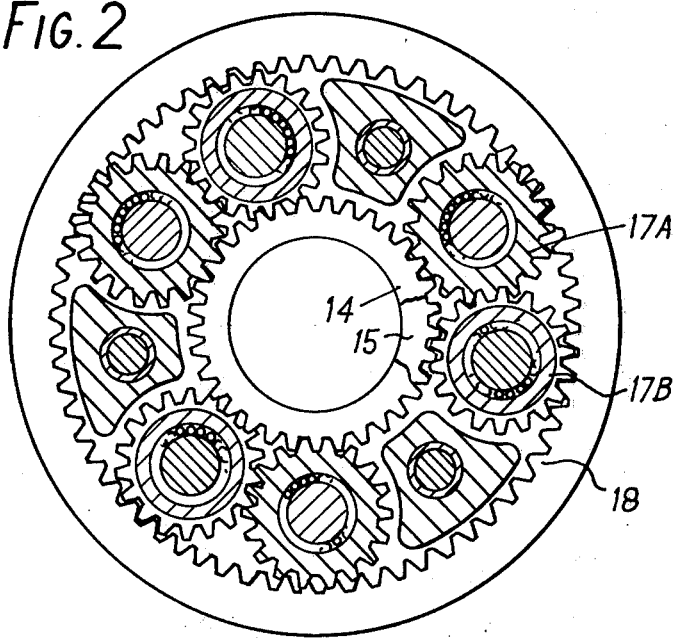
FIG. 2 is a view of some of the gears shown in FIG. 1.

The sunwheel 13 has an additional integral sunwheel 14 which meshes with three pinions 17A. These pinions mesh respectively with three other pinions 17B (FIG. 2) which mesh with a sunwheel 15 on the sleeve 22 and with an internally toothed ring gear 18. The ring gear 18 also serves as a brake drum which is surrounded by a brake band 31.

The pinions 12 are carried by spindles 12A that are mounted in a carrier 12B that is splined on the sleeve 8.

The pinions 17B, are similarly mounted on a carrier 25 that is carried by a hub 25A and is also attached to the sleeve 7 by bolts 7B.

The parts 12, 13, 24 constitute a first gearing and the parts 14, 15, 17A, 17B constitute a second gearing corresponding to the similar parts in British specification No. 1347045.

The first gearing 12, 13, 24 is connected via sleeve 8 with the impeller 1 and the second gearing is connected with the first gearing by the sunwheel 13, 14 and with the turbine T through sleeve 7 and with the output shaft through the carrier 25.

Reaction from reactor R acts through both detents 41 and 38 in series on the brake drum 35 and to a stationary part through the brake band 30.

The housing 11 drives a pump 52, 53 through a sleeve 54. This pump provides oil pressure to charge the converter and to act on piston and cylinder devices to engage the brakes.

Teeth 71 can be engaged by a pawl to provide a parking lock.

A block 56 has valve ports to regulate the pressure provided by the pump and to direct the oil pressure to the brake pistons as required. A control arm 42 moves a valve member 43 to select the brakes and a control arm 44 causes the pump pressures to be varied. The blades comprising the circulatory turbine TC can be moved to different angles. The blades are formed integrally with crank arms 58. (FIGS. 1 and 2) which engage a sliding cylinder 59 which rotates with and slides on block 59A. A space 61 between the cylinder 59 and block 59A is connected to near the axis of the converter by channels 62 formed between the plates 73, 73A. A ball valve 60 can connect the space 61 to the interior space of the converter housing 11.

The operation is as follows: The converter acts for normal running as described in the specification of British Pat. No. 1347045.

For all forward running the brake 30 is applied and the brake 31 (and 32 FIG. 5) is released.

To obtain reverse drive the brake 30 is released and brake 31 applied. This causes the torque on the reactor R to act on the sunwheel 15 and drive the output shaft 21 backwards through gearing 15, 17B and 18. The torque from the circulatory turbine TC acts on the carrier of gear train 13, 12, 24 and applies torque to the impeller I as for forward running. Torque is also applied to sunwheel 13 and thereby to 14, 17A, 17B and 18. This also produces a reversed torque on the output shaft 21. The turbine T continues to act in the forwards direction but the reversed torque from the reactor through the gearing 15, 17B, 18 is greatly in excess and provides a stall torque ratio at least as great as that obtained for forward running.

When operating in "Forwards" with brake 30 applied, and braking is desired, brake 31 is applied. The sleeve 22 is then driven at an over-speed through gear train 18, 17B, 15. The brake 30 need not be disengaged as one-way detent 38 will allow the sleeve to rotate forwards. One-way detent 41 will engage so that the reactor R will be driven forwards. The converter acts as a retarder with torus flow in the reverse direction. The circulatory turbine RC, which is driven forwards by the fluid, drives the impeller through gear train 13, 12, 24 and applies negative torque on the output shaft through gear train 14, 17A, 17B, 18 which provides a degree of 'engine braking.' If it were not for the action of TC and the gearing, the impeller I and input shaft would tend to stop and rotate backwards.

For neutral condition, both brakes 30 and 31 are applied as also for 'Park' when teeth 71 are engaged with a stationary part by means of a pawl (not shown).

With 'Neutral' selected the output shaft because of one-way detent 38 may be rotated forwards but cannot be driven from the converter.

The angles of the blades of RC are varied. The blades are 'opened' by the fluid flow within the converter and 'closed' by means of the converter charge pressure acting on the cylinder 59. The charge pressure can be varied by movement of the arm 44 which may be connected with a speed or throttle control pedal.

The blade control system shown 58, 59, 60, 61, 62 FIG. 1 enables the capacity of the converter to be varied during operation and provides a more constant input speed throughout the range. The torque on the blades tends to 'open' the blades and the charging pressure acting on 59 tends to 'close' the blades.

Centrifugal pressure on the fluid within channel 62 and space 61 tends to open the blades. The torque on the blades varies with speed ratio and TC runs at variable speeds thereby varying the pressure in space 61. The position of the blades varies automatically.

Figure 3:
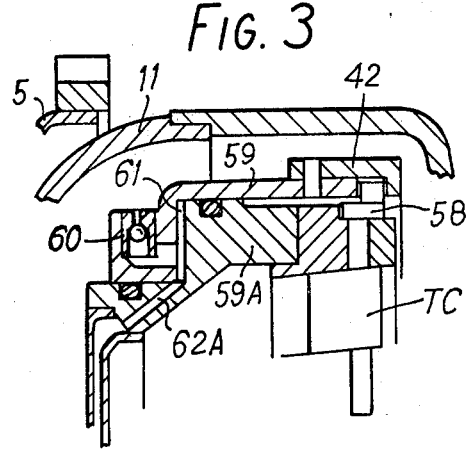
FIG. 3 is a view of a detail shown in FIG. 1 but on a larger scale.

The turbine TC runs more slowly than the input at high ratios, i.e., nearer stall and at speeds greater than the input at small ratios, i.e., nearer coupling. At high ratios the centrifugal pressure in space 62 may however be too low for best results and the ball valve 60 allows leakage and increase in pressure in space 62 over the range when pressure in the space is lower than that within the converter housing 11 and when the centrifugal load on ball 60 FIG. 3 is low enough to be opened by the pressure within the converter.

Varying the charge pressure varies the total pressure acting on the outside of cylinder 59 and provides an overriding control.

'Neutral' is selected by the arm 42 which is arranged also to contact the arm 44 to move it to the position giving maximum charge pressure. This causes the circulatory turbine blades to shut thereby restricting torus flow. Drag and drive in the converter will tend to drive the output shaft forwards but any flow over R will tend to drive the output shaft backwards to a greater extent. The output shaft cannot rotate backwards because of detent 38 and brake 30. The output shaft cannot therefore be driven by the converter.

Both brakes 30, 31 may be applied for 'Park.'

Figure 4:
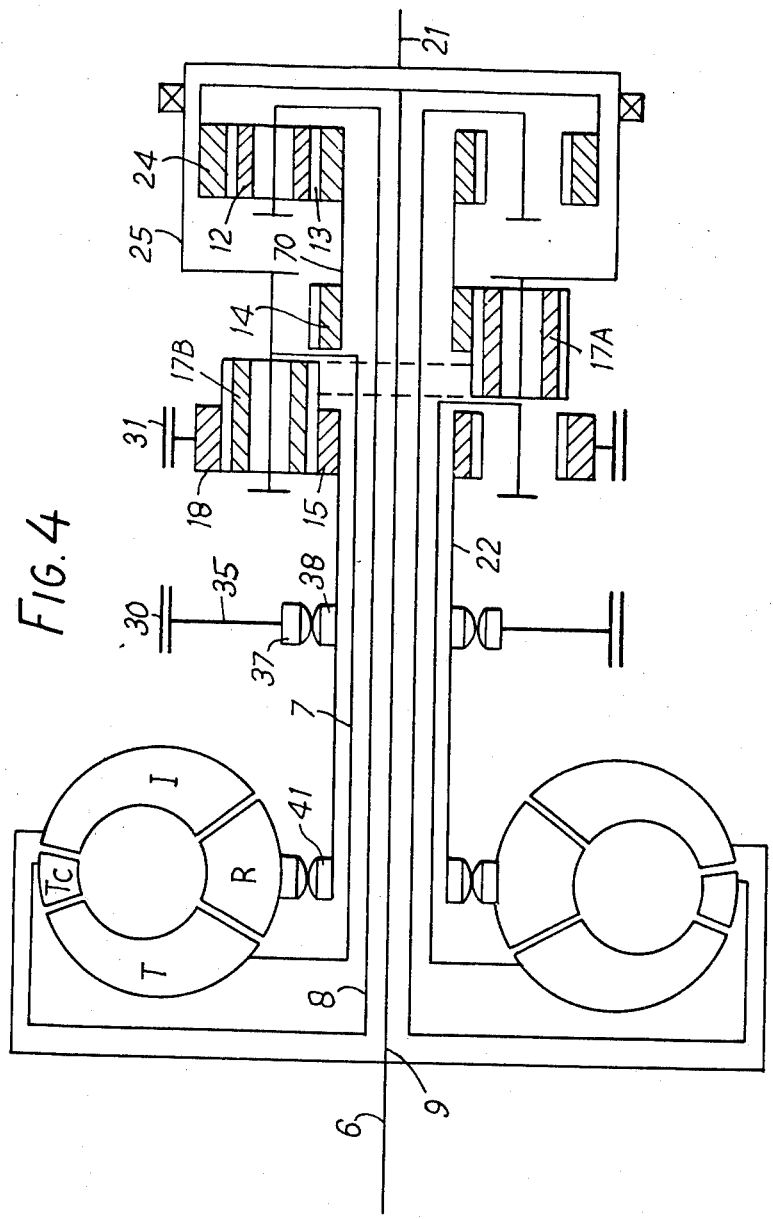
FIG. 4 is a diagrammatic illustration of the apparatus shown in FIG. 1.

FIG. 4 shows a similar arrangement of the apparatus in diagrammatic form.

Figure 5:
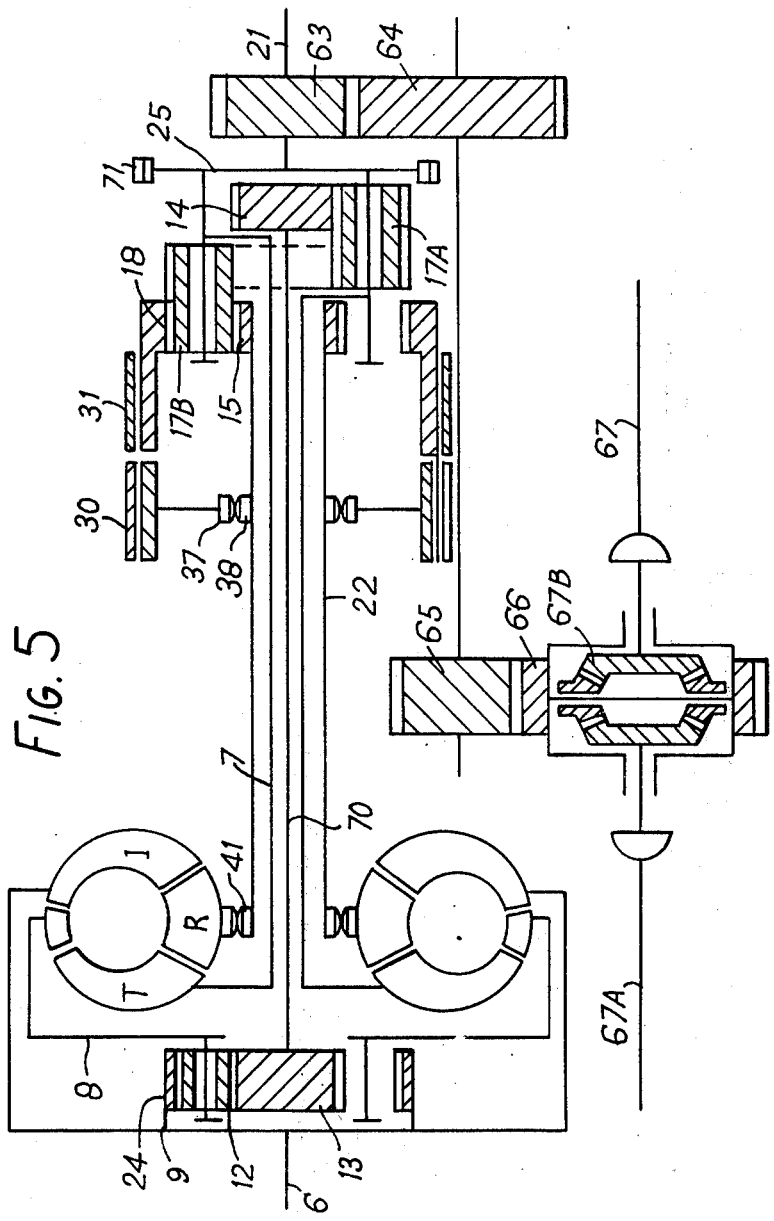
FIGS. 5, 6 and 7 are diagrammatic illustrations of modified forms of the apparatus made in accordance with the invention.

FIG. 5 shows a modified arrangement of the parts and in which the gear train 13, 12, 24 is within the converter. Gearing 63, 64, 65, 66 provides a drive to the differential gear 67B and output shafts 67, 67A for a motor car transverse engine installation. The axis of the apparatus is parallel to the axis of the differential gear. Alternatively an inline drive can be obtained from output 21. Sunwheels 13, 14 are connected by a central shaft 70.

Figure 6:
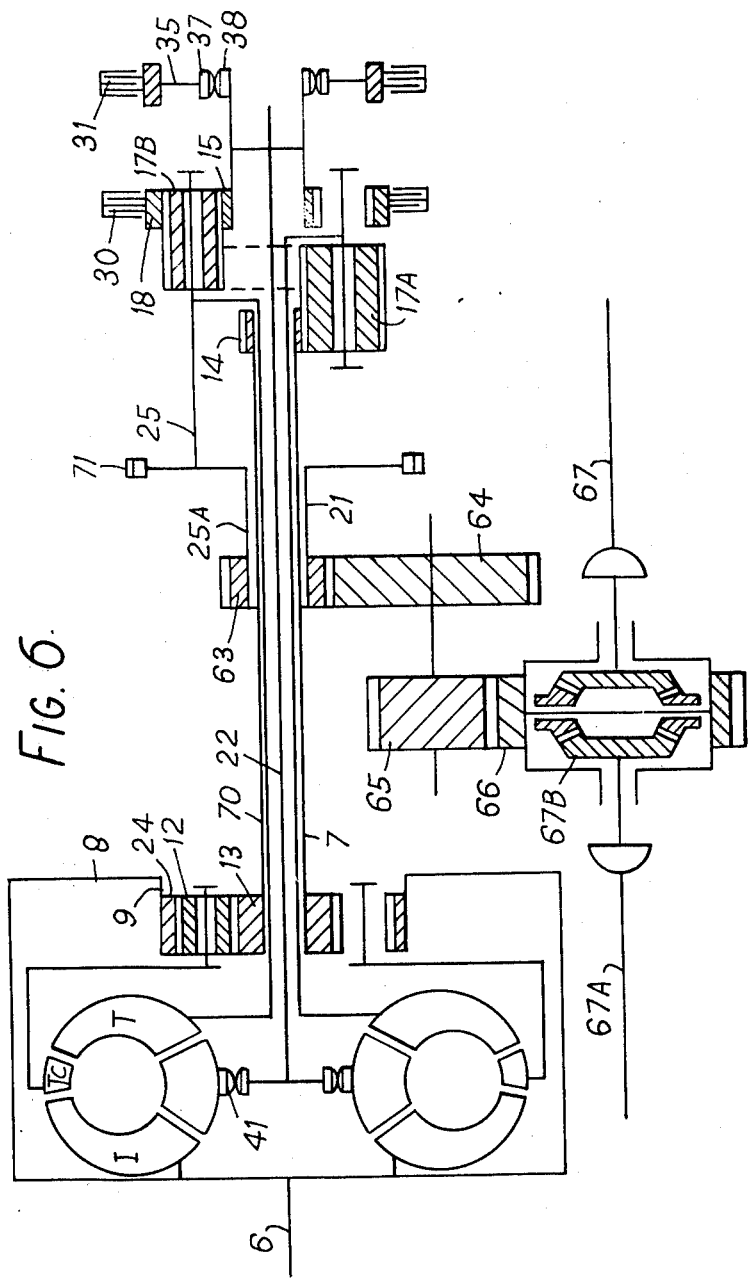

FIG. 6 shows a transverse engine arrangement with the gear train 13, 12, 24 within the converter. The first gearing 12, 13, 24 is located between the converter and the second gearing. The second gearing is located between the first gearing and the first detent 37, 38. The second gearing sunwheel is connected by a sleeve 70 to the sunwheel 13 of the first gearing. The pinions of the second gearing are mounted on the carrier 25 which is carried by a sleeve 25A which surrounds the sleeve 70 and is geared by output gears 63, 64, 65, 66 to the differential 67B of the motor car axle, having output shafts 67, 67A. The axis of the sleeves 70, 25A are parallel to the axis of the differential gear.

Figure 7:
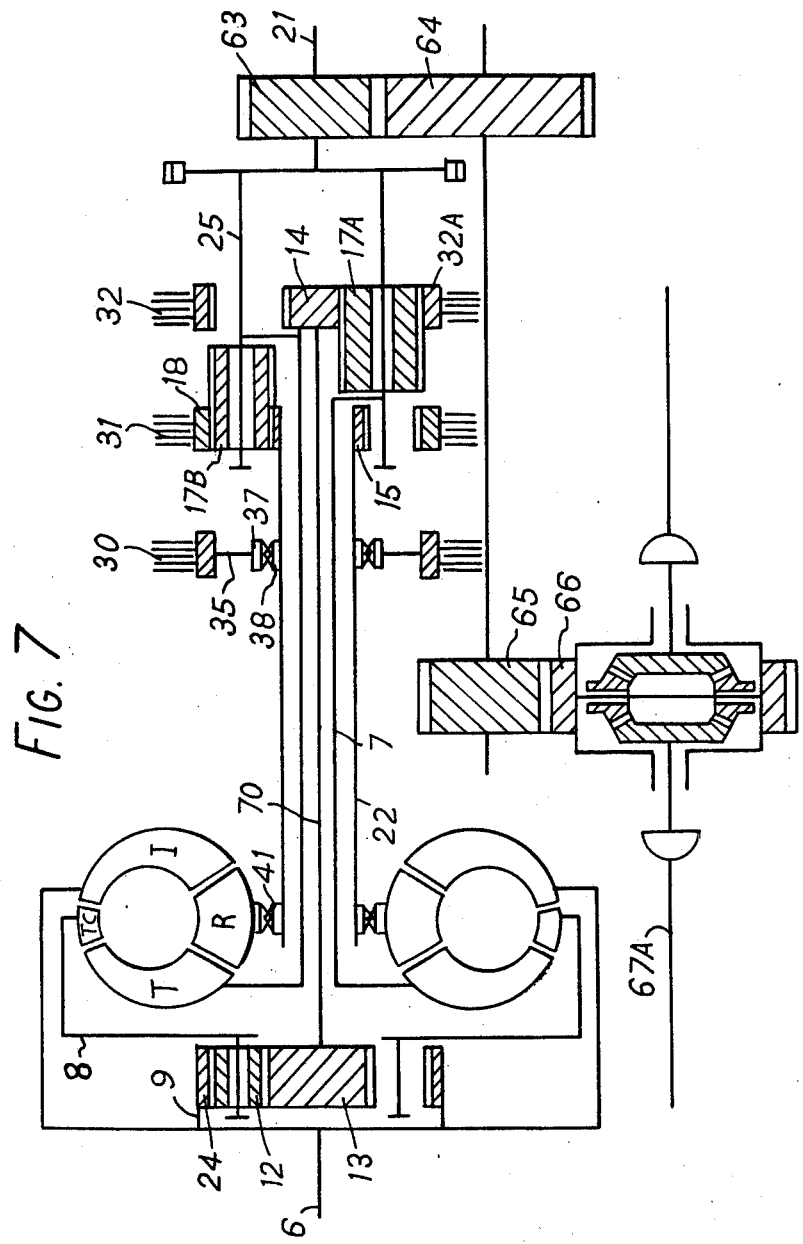

FIG. 7 shows a modified arrangement having an additional toothed ring gear 32A meshing with gears 17A, 14 to form an additional epicyclic train 32, 17A, 14. The ring gear 32A carries the additional brake 32. The brakes 30, 31, 32 comprise plates and are engaged by annular pistons mounted in the casing of the apparatus.

This arrangement provides a 'Low' and can produce greater torque conversion if brake 32 is engaged instead of brake 30. With brake 32 applied, torque from the circulatory turbine acting on the carrier of gear train 13, 12, 24 produces 'forwards' torque on the output shaft through gears 13, 14, 17A, 32A and negative torque on the reactor produces 'forwards' torque through gears 15, 17B, 17A, 32. Torque on the turbine acts to drive the output shaft. Torque on the output shaft may reach more than eight times the torque on the input shaft.

I claim:

1. Power transmission apparatus comprising a torque converter having an input shaft, an impeller connected to the input shaft, an output turbine, a reactor and a circulatory turbine disposed in the flow path between the impeller and output turbine, a first gearing connecting the circulatory turbine to the input shaft so that the said circulatory turbine will always rotate with and in the same direction as the said impeller, a second gearing connecting the first gearing to the output shaft and to a stationary part, said second gearing including a part which is acted on by a friction brake so that it can be connected with or disconnected from said stationary part, said second gearing including an internally toothed ring gear acted on by said second gearing brake, a sunwheel, and pinions meshing with the ring gear and the sunwheel, the first unidirectional detent acting between a part of the second gearing and said stationary part, and the second unidirectional detent acting between the reactor and the second gearing, said sunwheel being connected to each of said detents, said detents being in series so that forwards rotation of a part of the second gearing drives the reactor in a forwards direction and negative torque on either the reactor or said part of the second gearing can act on said stationary part.

2. An apparatus as claimed in claim 1 wherein the first detent is provided with a friction brake so that it can be connected with and disconnected from said stationary part.

3. Apparatus as claimed in claim 1, having a rotary housing containing charge fluid and containing the impeller, reactor and turbines, means confining a space (61) and carried by the circulatory turbine, said space containing fluid under centrifugal force said circulatory turbine having blades of variable angle and a valve between said space and the interior of the rotary housing which permits leakage of fluid to said space only at reduced rotary speeds of said space, said space communicating with said blades to vary the angle thereof, increasing pressure in said space tending to open the blades.

4. Apparatus as claimed in claim 1 including a carrier connected to the output shaft, the pinions of the second gearing being mounted in said carrier and the first gearing including a ring gear, sunwheel and planet pinions and carrier, said first gearing carrier being connected with the circulatory turbine, said planet pinions being mounted in said first gearing carrier; the sunwheel of the first gearing being geared with pinions of the second gearing and the ring gear of the first gearing is connected with the input shaft.

5. Apparatus as claimed in claim 1 having a carrier connected to the output shaft, the pinions of the second gearing being carried by said carrier, said first gearing including a ring gear, sunwheel, planet pinions and a carrier, said first gearing carrier being connected with the circulatory turbine; the planet pinions being mounted on said first gearing carrier, another sunwheel geared with pinions of the second gearing and the ring gear of the first gearing being connected with the input shaft; the second gearing being located between the converter and first gearing, said sunwheels being integrally connected together.

6. Apparatus as claimed in claim 1 including a carrier connected to the output shaft, the pinions of the second gearing being carried by said carrier, the first gearing including a ring gear, sunwheel, planet pinions and a carrier, said first gearing carrier being connected with the circulatory turbine; the planet pinions being mounted on said first gearing carrier, another sunwheel geared with pinions of the second gearing and the ring gear of the first gearing being connected with the input shaft; the converter being located between the first and second gearings, a shaft which passes through the converter, the sunwheels of the first and second gearings being connected to said shaft on opposite sides of the converter.

7. In a motor-car having a transverse engine and a differential gear, the provision of an apparatus as claimed in claim 1 wherein the second gearing includes a carrier which carries the pinions which carrier is geared to the differential of the motor car axle, the axis of the apparatus being parallel to the axle of the differential gear.

8. In a motor car having a differential gear, the provision of an apparatus as claimed in claim 1 including a carrier connected to the output shaft, said pinions being mounted on said carrier, the first gearing including a ring gear, sunwheel, planet pinions and a carrier, said first gearing carrier being connected with the circulatory turbine; the sunwheel of the first gearing being geared with pinions of the second gearing and the ring gear of the first gearing being connected with the input shaft; the first gearing being located between the converter and the second gearing, the second gearing being located between the first gearing and the first detent; a sleeve connecting the second gearing sunwheel to the sunwheel forming part of the first gearing, a second sleeve, said second sleeve surrounding the sunwheels sleeve, the second gearing pinions being mounted on said second sleeve, output gears connecting said second sleeve to the differential gear of the motor car with the axes of said sleeves parallel to the axis of the differential gear, said output gears being located between the first gearing and the second gearing.

9. Apparatus as claimed in claim 1 wherein the first gearing includes a sunwheel and planet pinions and wherein the second gearing includes two sets of said pinions, the pinions of one set meshing respectively with the pinions of the other set, two internally toothed ring gears meshing with the two sets of pinions respectively, two friction brakes acting on the ring gears respectively, and two sunwheels one of which is acted on by said detents and the other of which is connected to the sunwheel of the first gearing.

10. Apparatus as claimed in claim 1 wherein the circulatory turbine includes variable angle blades, and said apparatus includes a sliding member, crank arms connected with said blades and with said sliding member, said sliding member being urged in one direction by the converter charge fluid pressure and in the opposite direction by the centrifugal pressure of fluid caused by the rotation of the circulatory turbine.

* * * * *